March 25, 1958 W. S. RAYNOR 2,827,999
ARTICLE HANDLING APPARATUS
Filed May 14, 1956 6 Sheets-Sheet 1
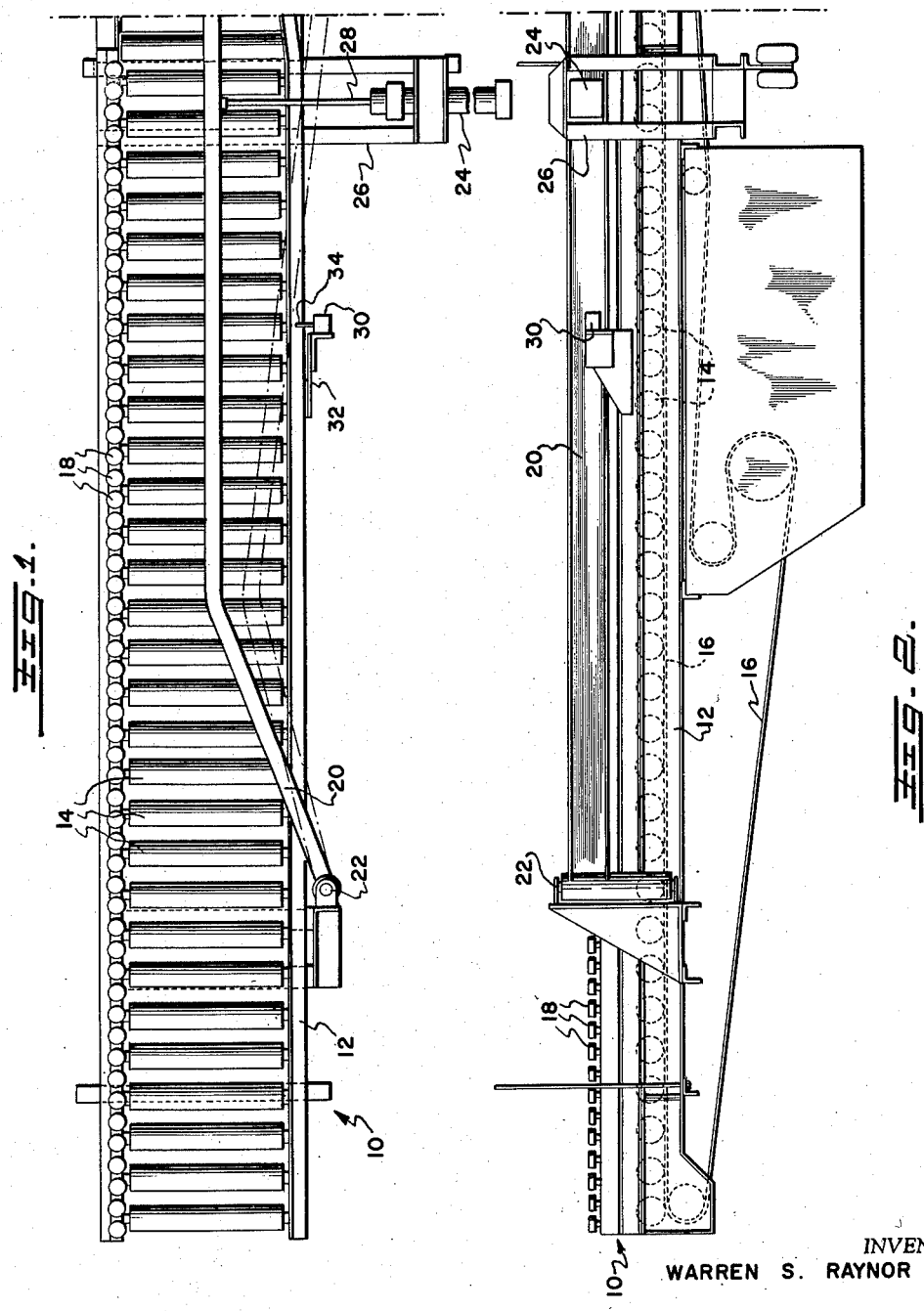
INVENTOR
WARREN S. RAYNOR
BY
Mead, Browne, Schuyler & Beveridge
ATTORNEYS

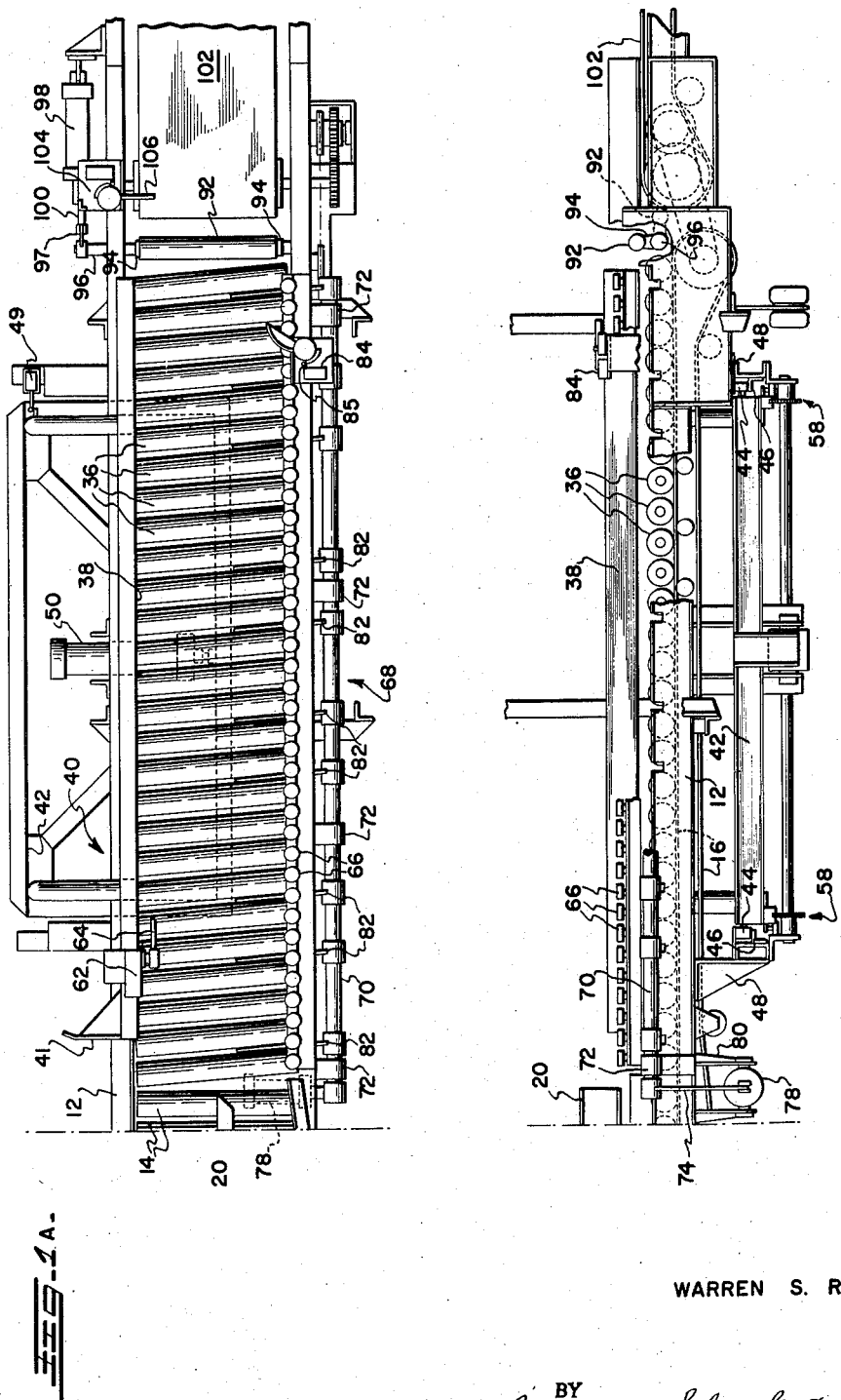

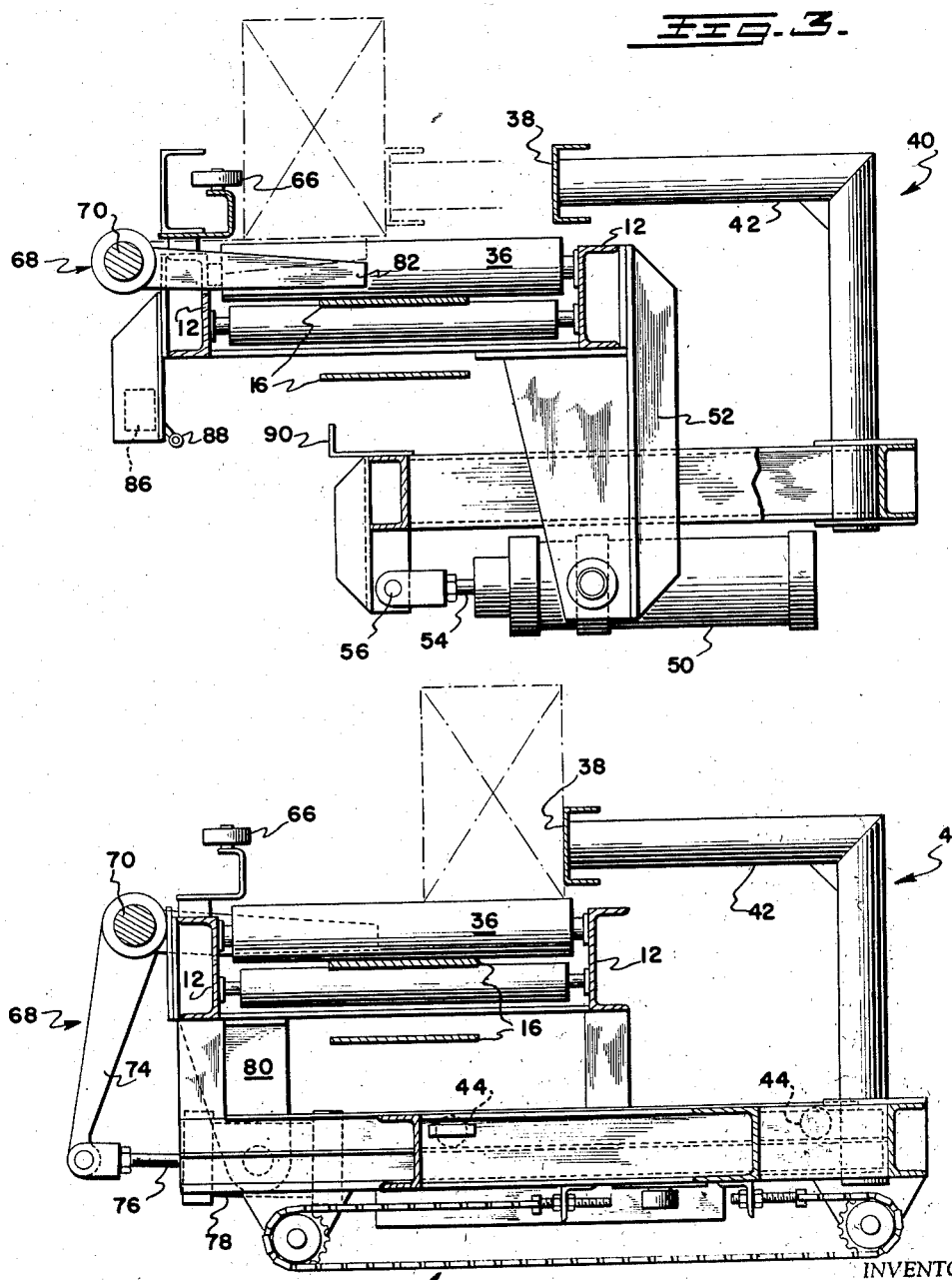

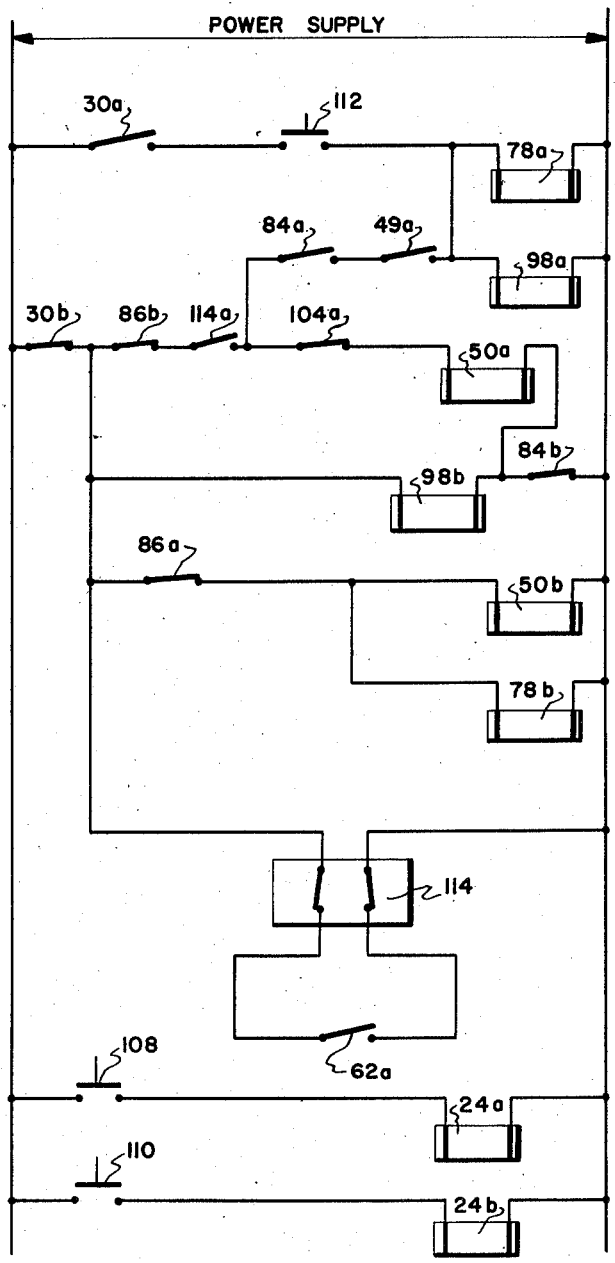

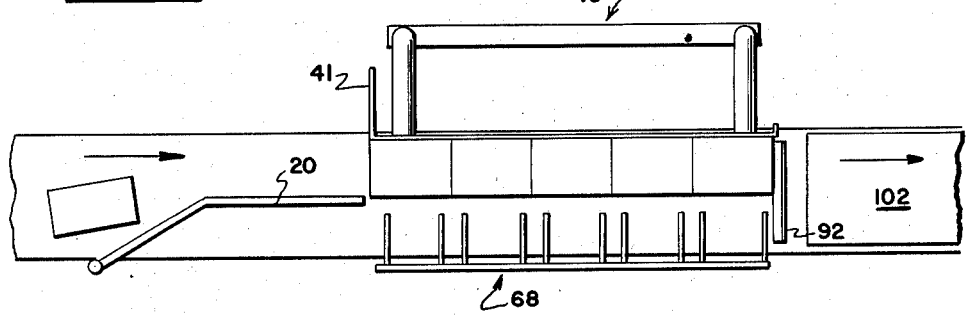
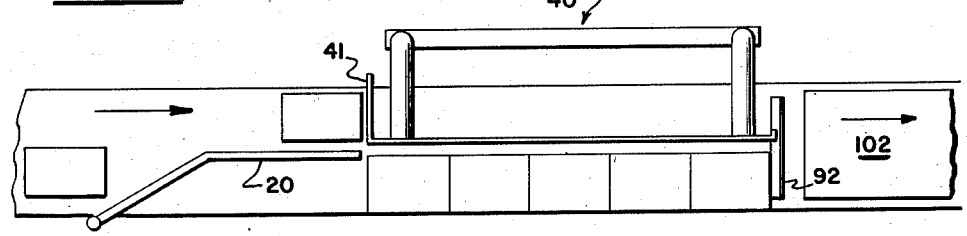
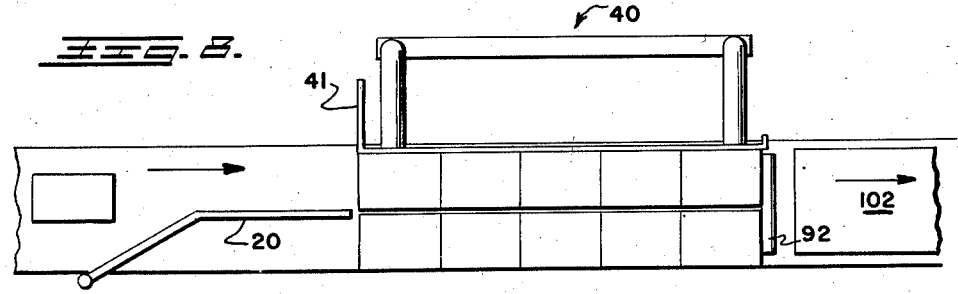
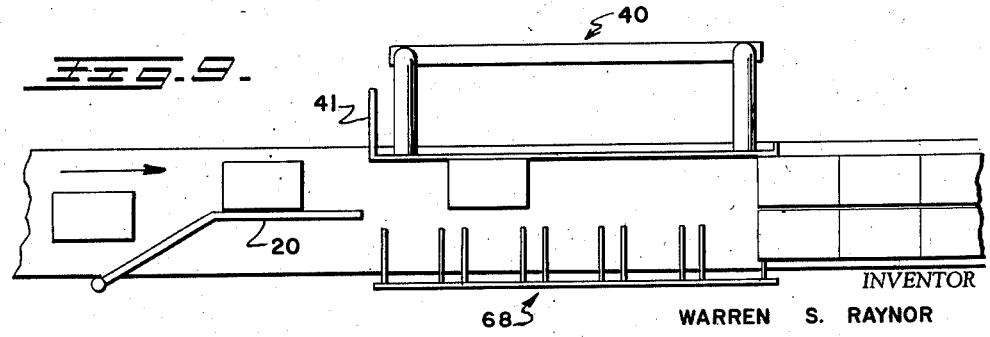

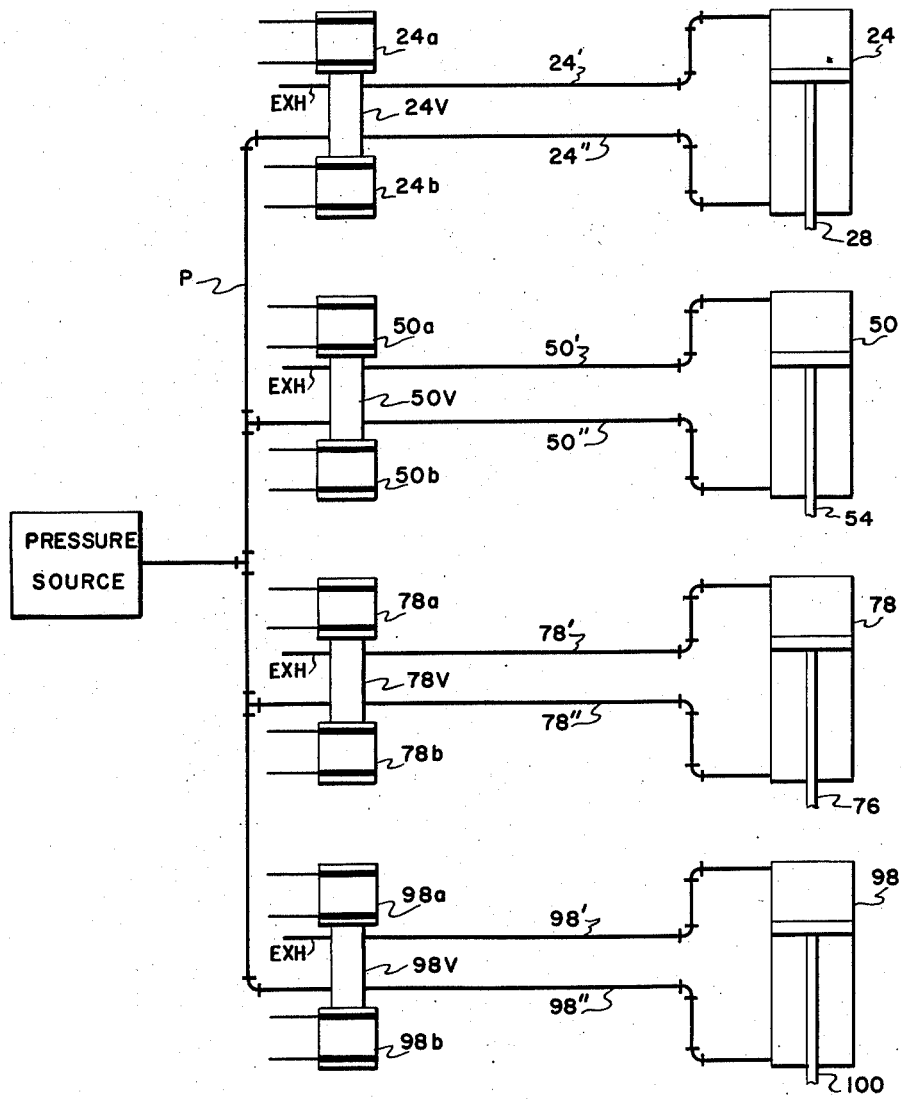

United States Patent Office 2,827,999
Patented Mar. 25, 1958

2,827,999

ARTICLE HANDLING APPARATUS

Warren S. Raynor, Port Hope, Ontario, Canada, assignor to Mathews Conveyor Company, Ellwood City, Pa., a corporation of Pennsylvania Application May 14, 1956, Serial No. 584,563

Claims priority, application Canada June 2, 1955

24 Claims. (Cl. 198—34)

This invention relates to conveyer systems, and more particularly to an article handling apparatus for automatically assembling articles conveyed in single line into groups of articles paired in side by side relationship.

The invention to be described finds particular application in the beverage industry where conveyer systems capable of handling cartons of different standardized sizes are necessary. In one particular instance, beer is packed in two types of cartons, one type of carton containing twelve bottles arranged in two rows of six bottles apiece and another type of carton containing 24 bottles arranged in four rows of six apiece. Transfer of the smaller carton upon a conveyer which, for reasons of economy, must also handle the larger and wider carton has given rise to certain problems. First, the smaller carton is somewhat unstable upon the conveyer due to its long narrow configuration. Second, if these cartons are fed along the conveyer singly, a storage line twice as long as the storage line required for the larger carton must be provided. In addition, the smaller carton tends to position itself somewhat crosswise of the conveyer system in a manner which may thus cause jams. When the smaller cartons are conveyed singly to a hand stacking area, workers tend to remove the cartons from the conveyer one at a time.

Similar cartons conveyed in pairs tend to support each other upon the conveyer and are more stable during the conveying operation as well as having a lesser tendency to turn crosswise to the direction of conveying. Obviously, if the cartons are transferred in pairs, the volume of cartons transferred in a given time is increased and the length of storage line necessary for a given number of cartons is reduced. Further, when the cartons are conveyed to a hand stacking area in pairs, the workers may easily remove a pair of cartons at a time, thus materially reducing the stacking time.

Accordingly, one major object of my invention is to provide an article handling apparatus in which articles travelling along a conveyer line are automatically assembled into groups of articles in paired side by side relationship.

In the development of article handling apparatus capable of achieving the foregoing object, consideration must be given to the fact that the apparatus should be adapted to handle more than one type of carton. The manner in which the smaller articles are assembled into groups must be capable of performance by apparatus which is also adapted to transfer larger articles.

Therefore, another major object of my invention is to provide apparatus for assembling conveyed articles into side by side relationship which is adapted for employment in a system also capable of direct and uninterrupted conveyance of articles.

A third major object of my invention is to provide an article handling apparatus adapted to selectively permit the direct and uninterrupted flow of conveyed articles therethrough or to assemble conveyed articles into paired side by side relationship.

These, and other objects, are achieved, according to this invention, in a conveyer system having a guide member which may be positioned to guide articles entering an accumulation area on the conveyer downstream of said guide member onto a first portion of that area. A retractable stop located at the discharge end of the accumulation area may be raised to prevent articles from leaving the accumulation area or lowered to permit articles to move from the accumulation area. A transfer member, mounted for reciprocating movement transversely across the first portion of the accumulation area, is actuable, upon the accumulation of a predetermined number of articles by the stop, to transfer the accumulated articles as a group to a second portion of the accumulation area which is behind and therefore shielded, by the guide member, from articles entering the accumulation area. The foregoing elements are operatively linked by a control system actuated by conveyed articles to operate in a cycle wherein alternate groups of accumulated articles are acted upon by the transfer member and the stop is lowered upon the accumulation of a subsequent group of articles. When the accumulated articles are transferred to the second portion of the accumulation area, a series of lifting fingers are actuated to lift the transferred cartons free of the conveying surface. The transfer member is then retracted to its rest position and a second group of articles flow onto the first portion of the accumulation area. When the number of articles in the second group becomes equal to the number of articles in the transferred first group, the stop at the discharge end of the accumulation area is lowered and simultaneously the lifting fingers are lowered to lower the first group of articles back onto the conveying surface. The two groups of articles then are conveyed from the accumulation area in side by side relationship. Automatic controls raise the stop member as the last pair of articles in the first and second groups leave the accumulation area, and the cycle of operation is then repeated.

The guide member may also be positioned in a retracted position in which it is substantially clear of the conveying surface. When the guide member is located in its retracted position, it actuates the control system to render the stop, lifter and transfer mechanism inoperative. In this situation, articles may pass directly through the accumulation area.

Other objects and advantages will become readily apparent by reference to the following specification taken in conjunction with the accompanying drawings.

In the drawings:

Fig. 1 is a plan view of a portion of a conveyer system employing my invention;

Fig. 1a is a plan view of a second portion of my conveyer system and is a continuation of the view shown in Fig. 1;

Fig. 2 is a side view of the portion of the conveyer system shown in Fig. 1;

Fig. 2a is a side view of that portion of the conveyer system shown in Fig. 1a;

Fig. 3 is a cross sectional view taken on line 3—3 of Fig. 1a;

Fig. 4 is a cross sectional view taken on the line 4—4 of Fig. 1a;

Fig. 5 is a schematic diagram of the electrical circuit employed in the control system;

Fig. 6 is a schematic diagram showing the accumulation of a first group of articles upon the accumulation area;

Fig. 7 is a schematic diagram showing the relative positions of the various elements immediately after the first group of articles has been transferred to a second portion of the accumulation area;

Fig. 8 is a schematic diagram showing the accumulation of a second group of articles upon the first portion of the accumulation area;

Figure 9 is a schematic diagram showing the first and second group of articles leaving the accumulation area in paired side by side relationship; and Fig. 10 is a schematic diagram of the pneumatic system.

Referring first to Figs. 1 and 2, a conveyer having a powered roll conveying surface is designated generally by the numeral 10. The conveyer includes a frame 12 in which a plurality of rollers 14 are rotatably supported. Rollers 14 may be driven by a belt 16 which in turn is driven by a motor (not shown) in a more or less conventional manner. A series of guide rollers 18 are supported on frame 12 along one side of the conveyer and serve to prevent articles from toppling off this side of the conveyer. On the opposite side of the conveyer, a guide member 20 is pivotally supported as at 22 upon frame 12 for pivotal movement in a horizontal plane above the conveying surface between the full line position shown in Fig. 1 and the hidden line position indicated in Fig. 1. Movement of guide member 20 in this manner is accomplished by an expansible chamber motor 24, the cylinder of which is mounted upon frame 12 by structural members 26. The piston of expansible chamber motor 24 is coupled by piston rod 28 to guide member 20 and thus, by actuation of motor 24 in a manner well known in the art, guide member 20 may be positioned in the operative position shown in full lines in Fig. 1 or retracted to the hidden line position shown in Fig. 1. A switch 30 is fixedly mounted upon frame 12 at 32 and has a striker 34 which is positioned so as to be contacted by guide member 20 when guide member 20 is moved to its retracted position.

Referring now to Fig. 1a, the portion of the conveyer downstream of guide arm 20 has a conveying surface formed by rolls 36 which are "cut" or mounted for rotation about an axis which is angularly offset with respect to the axis of conveying rolls 14. That portion of the conveying surface presented by rolls 36 will hereinafter be referred to as the accumulation area, since it is upon this portion of the conveying surface that the articles are assembled into side by side relationship. The accumulation area, for purposes of description, is divided into a first portion and a second portion, the first portion being that portion of the accumulation area between the longitudinal center line of the conveyer and pusher plate 38 and the second portion being the corresponding area on the opposite side of the center line. Rolls 36 are driven from belt 16 in the same manner as conveying rolls 14 and the inclination or "cut" of their axis of rotation tends to drive articles conveyed over these rolls against pusher plate 38 of a transfer assembly 40 extending along one side of the conveyer from the entry portion of the accumulation area. At the entry end of plate 38, a bracket 41 is mounted to prevent entry of articles when the transfer assembly moves from its retracted position (note Fig. 7).

Referring now to Figs. 3 and 4, a pusher plate 38 is mounted upon a framework 42. Frame 42 is supported upon conveyer frame 12 by rollers 44 (see Figs. 2a and 4) which engage tracks 46 fixedly secured to frame 12 as by structural members 48. Transfer assembly 40 is thus mounted for reciprocating movement across a portion of the accumulation area from its retracted position shown in full lines in Fig. 3, to the hidden line position shown in Fig. 3. Secured to conveyer frame 12 adjacent transfer assembly 40 is an electrical switch 49 which is held closed by the transfer assembly when in its retracted position. Movement of transfer assembly 40 is accomplished by an expansible chamber motor 50, the cylinder of which is mounted upon frame 12 as by structural member 52. Piston rod 54 of expansible chamber motor 50 is connected to frame 42 of transfer assembly 40 as at 56 (see Fig. 3) to transmit piston movement to assembly 40. In view of the length of the transfer assembly, a chain and sprocket arrangement designated generally by the numeral 58 is located at each end of frame 42 to assure the equal movement of both ends of the transfer assembly when actuated by motor 50. At the end of pusher plate 38 which is adjacent the entry of the accumulation area, a bracket 41 is secured to prevent the entry of cartons into the accumulation area when the pusher is in its forwardmost position, as illustrated in Fig. 7.

Secured to conveyer frame 12 at a position adjacent the entry or upstream end of the accumulation area is a switch 62. Switch 62 has a striker or actuating arm 64 which is positioned to be engaged by cartons entering the accumulation area. The purpose and operation of switch 62 will be described in detail in connection with the description of the electrical control circuit below.

On the side of the conveyer opposite the transfer assembly 40, a series of guide rollers 66, similar in construction and purpose to guide rollers 18, are supported upon conveyer frame 12. Also mounted upon this side of the accumulation area, as best seen in Figs. 3 and 4, is a lifter assembly indicated generally by the numeral 68.

Lifter assembly 68 includes a longitudinally extending shaft 70 which is journaled for rotation within a plurality of bushings 72 secured to the conveyer frame 12. Fixed upon one end of shaft 70 is a crank 74 which couples shaft 70 to piston rod 76 of an expansible chamber motor 78, the cylinder of which is secured to frame 12 as by structural members 80. At various positions along shaft 70, lifter fingers 82 are fixedly secured upon the shaft and extend inwardly from the shaft to positions between adjacent rollers 36 of the accumulation area. By actuation of expansible chamber motor 78, lifter fingers 82 may be simultaneously moved from the lowered position shown in full lines in Fig. 3 to the hidden line position shown in Fig. 3 wherein lifter fingers 82 act to raise articles free of the conveying surface presented by rollers 36. The lifting of the articles from the conveying surface is especially desirable when the rolls 36 are "cut" as illustrated in Fig. 1a, since the rolls 36 would otherwise tend to move the transferred articles back toward the first portion and hinder further accumulation of articles.

Two electrical switches are fixedly supported upon this side of the conveyer, switch 84 (see Fig. 3 and Fig. 1a) being mounted above frame 12 so that its striker 85 may be actuated by cartons (as shown in hidden lines in Fig. 3) which have been transferred to the leftwardmost side of the conveyer as in Fig. 3. Switch 86 is mounted upon frame 12 in a position where its striker 88 may be engaged by a projection 90 upon frame 42 when the transfer assembly 40 is moved to its hidden line position in Fig. 3.

At the discharge or downstream end of the accumulation area, a stop roller 92 (see Figs. 1a and 2a) is supported upon cranks 94 which are secured at their other end to a shaft 96 which is journaled in conveyer frame 12. Stop roller 92 may be moved between the full line position shown in Fig. 2a and the hidden line position of Fig. 2a. When stop member 92 is in its uppermost position as shown in full lines in Fig. 2a, the movement of articles from the accumulation area is effectively prevented, while discharge movement of articles from the accumulation area may take place when the stop is retracted to the hidden line position of Fig. 2a. Actuation of the stop 92 is initiated by an expansible chamber motor 98 which is secured to the conveyer frame 12. The piston rod 100 of motor 98 is coupled at 97 to the shaft 96 to cause rotation of the shaft and thereby move roller 92 between its two positions.

A second conveying surface 102 conducts articles away from the accumulation area when such movement is permitted by stop member 92. In the disclosed embodiment, this conveying surface takes the form of a belt which may be driven directly from the same mechanism which drives the powered rolls upon the accumulation area and entry conveyer as illustrated in Fig. 2a. Mounted above conveying surface 102 adjacent the discharge end of the accumulation area is a switch 104 having a striker 106 which is contacted by cartons leaving the accumulation area.

The pneumatic circuit employed in conjunction with guide member motor 24, transfer assembly motor 50, lifter operating motor 78 and stop operating motor 98 is illustrated schematically in Fig. 10. As seen in Fig. 10, the chambers on each side of the piston of guide member operating motor 24 are connected by air lines 24' and 24" to respective ports of a four way reversing valve 24v. Valve 24v is provided with an exhaust port and a fourth port which is connected by air line p to a suitable source of pressure. Operatively associated with the valve 24v are two operating solenoid coils 24a and 24b which, as seen in the electrical diagram of Fig. 5 may be selectively energized by operation of push button 108 or 110.

The internal connection of valve 24v is such that when one of the solenoid coils, for example 24a, is energized line p is connected to the line 24' and line 24" is connected to the exhaust port of valve 24v to drive the piston of motor 24 to the right as viewed in Fig. 10. Suitable mechanical latch devices may be employed within the valve to maintain these connections mechanically upon a subsequent de-energization of the solenoid coil 24a. When solenoid coil 24a is de-energized, a subsequent energization of solenoid coil 24b will act to release the latch and reverse the pneumatic connections, thus connecting pressure line p with line 24" and simultaneously connecting line 24' with the exhaust port of valve 24v to drive the piston to the left. A similar latch is employed to maintain the reversed connection. The constructional details of valves of this type are well known in the art and further description of the constructional details would be superfluous.

The pneumatic connections and valves employed with transfer assembly motor 50, lifter operating motor 78, and stop operating motor 98 are similar to those of pusher operating motor 24, and the description of the pneumatic system employed with guide member motor 24 is equally applicable to the remaining element operating motors.

*Operation*

To initially set the control system for automatically assembling cartons in paired groups, guide member 20 is moved, if necessary, to its retracted position (hidden line position of Fig. 1) by actuating push button 110 to energize solenoid coil 24b which establishes the proper connections to motor 24 to drive the guide arm to this position. With guide member 20 in its retracted position, contacts 30a (Fig. 5) are closed and, by manual actuation of push button 112, solenoid coils 78a and 98a may be energized to respectively condition motors 78 and 98 to drive lifter fingers 82 and stop 92 to their retracted positions. Push button 110 is then manually actuated to energize solenoid coil 24b which in turn causes the actuation of guide member motor 24 in a manner which drives guide member 20 outwardly of the conveyer surface to its full line position as shown in Fig. 1. As guide member 20 moves away from switch 30, contacts 30a open and contacts 30b close. Since no cartons have entered the accumulation area as yet, no cartons are in contact with switch 84 at this time, and thus contacts 84b are closed. This completes a circuit across the power supply through contacts 30b, solenoid coil 98b and contacts 84b. Energization of solenoid coil 98b causes stop motor 98 to drive stop roller 92 upwardly into a position which will prevent cartons from leaving the accumulation area. Thus, prior to the entry of the first carton to be handled, the apparatus is conditioned with the guide member out, lifter fingers down, the stop up and the transfer assembly in its normal retracted position.

As cartons are conveyed along rollers 14 (from left to right in Fig. 1) the cartons are guided by guide arm 20 onto the first portion of the accumulation area. As cartons enter the accumulation area, the striker of switch 62 is momentarily contacted by each carton as it passes the switch. Time delay device 114 is set so that the period of time in which contacts 62a are closed by passing cartons is insufficient to cause the time delay device to operate. Therefore, cartons pass into the accumulation area and are biased by the cut of rollers 36 against pusher plate 38 of transfer assembly 40. The initial carton continues to move through the accumulation area until it comes into abutment with stop 92. Further cartons following the initial carton likewise traverse the accumulation area until they come into contact with the next preceding carton. Cartons continue to accumulate until finally a carton is halted at a position where it is in contact with the striker of switch 62 (see Fig. 6). This allows contacts 62a to remain closed a sufficient period of time to cause time delay relay 114 to actuate contacts 114a to a closed position.

The closing of contacts 114a completes a circuit across the power supply through contacts 30b, contacts 86b (closed because the transfer assembly is in its retracted position) contacts 114a, solenoid coil 50a and contacts 84b. Contacts 104a are closed at this time because no cartons are leaving the accumulation area, while contacts 84b are closed because no cartons have as yet been transferred across the accumulation area into contact with switch 84. Energization of solenoid coil 50a conditions transfer assembly motor 50 to drive the transfer assembly transversely across the accumulation area to the hidden line position as shown in Fig. 3. This action is illustrated in Fig. 7.

As the transferred cartons reach the side of the conveyor as illustrated in Fig. 7, striker 85 of switch 84 is contacted by the transferred cartons and acts to open contacts 84b and to close contacts 84a. Simultaneously, lug 90 upon transfer assembly 40 contacts striker 88 of switch 86 and acts to open contacts 86b and close contacts 86a. The closing of contacts 86a completes a circuit through contacts 30b, contacts 86a, and solenoid coils 50b and 78b. Energization of solenoid coil 50b acts to reverse the valve associated with pusher operating motor 50 to cause the motor to drive the pusher to its return position. Energization of solenoid coil 78b acts to cause lifter motor 78 to drive lifter fingers 82 into their elevated position (illustrated in hidden lines in Fig. 3) to lift the transferred cartons free of the conveying surface.

Although contacts 86a open immediately when the transfer assembly begins its return movement, the valves associated with the transfer assembly motor and the lifter motor remain in a position to which they have been actuated so the opening of the circuit through solenoid coils 50b and 78b has no influence upon the respective motors. During the time the transfer assembly is positioned over the conveying surface, bracket 41 prevents the entrance of additional cartons into the accumulation area until the transfer assembly has been returned to its retracted position as in Fig. 8.

As shown in Fig. 8, upon the retraction of the transfer assembly, an additional group of cartons is permitted to enter the accumulation area, and since stop 92 is still raised at this time, the cartons are again accumulated behind the stop. When a second group or row of cartons has been accumulated as shown in Fig. 8, switch 62 is again held closed by the last carton of the group for a sufficient period of time to cause the operation of time delay device 114 and the contacts 114a are again closed. Since the transfer assembly is in its retracted position, both contacts 86b and contacts 49a are closed. The presence of cartons upon the lifter fingers has actuated switch 84 to close contacts 84a and thus a circuit across the power supply is completed through contacts 30b, 86b, 114a, 84a and 49a through solenoid coils 78a and 98a. Energization of solenoid coil 78a and 98a, respectively cause the lifter operating motor and stop operating motor to drive these two elements to their lowered or retracted position. The lowering of stop 92 permits all articles in the accumulation area at this time to be driven from the discharge end of the accumulation area by the action of driving rollers 36 and the assembled cartons pass from the accumulation area in paired side by side relationship onto conveyer surface 102 as illustrated in Fig. 9. As the cartons leave the accumulation area, the striker of switch 104 is engaged and this switch acts to open contacts 104a while articles are leaving the accumulation area, thus effectively preventing the actuation of transfer assembly motor 50 since solenoid coil 50a would otherwise be energized when the last carton becomes disengaged from switch 84 and contacts 84b are closed. Upon the closing of contacts 84b, a circuit is completed through contacts 30b, solenoid coil 98b and contacts 84b to energize solenoid coil 98b and condition stop operating motor 98 to drive stop 92 back to its raised or accumulating condition. This assures that stop 92 is raised immediately as the last carton of the assembled group passes beyond switch 84 and thus the articles which start to flow again into the accumulation area as indicated in Fig. 9 are not allowed to follow the assembled group from the accumulation area.

The raising of stop 92 again conditions the various elements in their initial conditions as described above with the stop up, the transfer assembly retracted and the lifter fingers lowered. The assembly cycle described above is repeated in the same manner.

As has been previously stated, it is often desirable to handle cartons of a different standard size upon the same conveyer assembly. In the particular application under discussion, the two standard sizes are the one dozen carton in which bottles are arranged in two rows of six bottles apiece, and the two dozen carton, consisting of four rows of bottles containing six bottles apiece. When the larger cartons are to be handled there is no occasion to perform the pairing up of the conveyed cartons since the two dozen carton has satisfactory stability and conveying characteristics.

When it is desired to handle the two dozen cartons or other types of articles, guide arm 20 is moved to its retracted position by operating push button 108 to energize solenoid coil 24a which causes guide arm motor 24 to drive the guide arm to its retracted (hidden line position in Fig. 1) condition. In this position, the guide arm engages striker 34 of switch 30 to open contacts 30b and simultaneously close contacts 30a. Contacts 30b provide a common connection for all solenoids across the power supply, and thus the opening of contacts 30b effectively renders all of the solenoid coils associated with the transfer assembly motor, the stop motor, and the lifter operating motor ineffective. Thus, the transfer assembly is maintained in its retracted position, the lifter fingers are in their lowered position. Stop 92 is also in its lowered position or may be driven to this position by actuation of push button 112 which simultaneously energizes the solenoid coils 78a and 98a to drive the lifters and stop to their respective lowered positions. The article handling apparatus is thus conditioned to permit the direct and uninterrupted flow of articles through the accumulation area.

While I have described but one structural embodiment of my invention, it will be readily apparent to those skilled in the art that the disclosed embodiment is capable of modifications. Therefore, the foregoing description is to be considered exemplary rather than limiting and the true scope of my invention is that defined in the following claims.

What I claim as my invention is:

1. Article handling apparatus comprising a conveyer, a stop operable in one position to accumulate groups of articles upon said conveyer adjacent one side thereof, a transfer mechanism located along said one side of said conveyer, and means actuable by alternate groups of articles for driving said transfer mechanism transversely across said conveyer to transfer said alternate groups of articles to the opposite side of said conveyer.

2. Article handling apparatus comprising a conveyer, first means operable in a first position to accumulate successive groups of articles upon said conveyor adjacent one side thereof, means for transferring alternate groups of accumulated articles to the opposite side of said conveyer, means actuated by a subsequent accumulated group of articles adjacent a transferred group of articles for locating said first means in a second position to permit conveying of previously accumulated groups of articles beyond said first means, and means actuated by the conveying of articles beyond said first means for restoring said first means to said first position.

3. Article handling apparatus comprising a conveyer, a retractable guide member movable to a guiding location above said conveyer to directing conveyed articles to a first portion of said conveyer extending along one side thereof, a pusher plate located along said one side of said conveyer, first article controlled means operable when said guide member is in said guiding location to drive said pusher plate transversely of said conveyer to transfer selected groups of articles from said first portion of said conveyer to a second portion extending along the opposite side of the conveyer downstream from said guide, and second article controlled means for rendering said pusher plate ineffective to transfer other selected groups of articles to thereby permit the last mentioned groups of articles to pass directly through said first portion of said conveyer.

4. Article handling apparatus comprising a conveyer having means for continuously moving articles along the conveying surface thereof, a guide member disposed above said conveyer for directing conveyed articles to a first portion of said conveying surface extending along one side of said conveyer, a pusher plate located along said one side of said conveyer, a retractable stop operable to accumulate conveyed articles upon said first portion of said conveying surface, and means operable upon the accumulation of a predetermined number of articles upon said first portion of said conveying surface to move said pusher plate transversely of said conveyer to transfer the accumulated artciles from said first portion of said conveying surface to a second portion extending along the opposite side of said conveyer downstream from said guide.

5. Article handling apparatus comprising a conveyer having means for continuously moving articles along the conveying surface thereof, a guide member disposed above said conveyer for directing conveyed articles to a first portion of said conveying surface extending along one side of said conveyer, a pusher plate located along said one side of said conveyer, a retractable stop operable to accumulate conveyed articles upon said first portion of said conveying surface, means operable by the accumulation of a predetermined number of articles upon said first portion of said conveying surface to move said pusher plate transversely of said conveyer to transfer the accumulated articles from said first portion of said conveying surface to a second portion, and means for lifting the transferred articles to a position above said second portion of said conveying surface.

6. Article handling apparatus comprising a conveyer having an article accumulation area thereon, means for accumulating a first group of articles on a first portion of said accumulation area, means actuable upon the accumulation of a predetermined number of articles in said first group to transfer said first group of articles to a second portion of said accumulation area, and means for releasing the accumulating means to permit movement of articles from said first and said second portions upon the accumulation by the accumulating means of a second group of articles, equal in number to said first group, upon said first portion.

7. Article handling apparatus comprising a conveyer having an article accumulation area thereon, means for guiding conveyed articles entering said accumulation area to a first portion thereof, means for accumulating articles upon said first portion of said accumulation area, means actuable upon the accumulation of a predetermined number of articles to transfer the accumulated articles as a first group to a second portion of said accumulation area immediately adjacent said first portion, and means for releasing the accumulating means to permit movement of articles from said first and second portions upon the accumulation by the accumulating means of a second group of articles, equal in number to said first group, upon said first portion.

8. Article handling apparatus as recited in claim 7 including means for retracting said means for guiding articles to a position adjacent one side of said conveyer and means actuated by said guide member when retracted to said position for permitting direct and uninterrupted flow of articles through said accumulation area.

9. Article handling apparatus comprising a conveyer having an article accumulation area thereon, means for guiding articles entering said accumulation area to a first portion thereof, means for accumulating a first group of articles upon said first portion, means actuable upon the accumulation of a predetermined number of articles in said first group to transfer said first group of articles to a second portion of said accumulation area shielded from articles entering said accumulation area by said guide means, and means for releasing the accumulating means to permit movement of articles from said first and second portions upon the accumulation by said accumulating means of a second group of articles, equal in number to said first group, upon said first portion.

10. Article handling apparatus as recited in claim 9 including means for retracting said means for guiding articles to a position adjacent one side of said conveyer and means actuated by said guide member when retracted to said position for permitting direct and uninterrupted flow of articles through said accumulation area.

11. Article handling apparatus comprising a conveyer having an article accumulation area thereon, a retractable stop operable to prevent or permit movement of articles from the discharge end of said accumulation area, means actuable upon the accumulation of a first group of articles by said stop to transfer the accumulated articles from that portion of the accumulation area upon which they have accumulated to an adjacent portion of said accumulation area, and means for retracting said stop to permit movement of articles from said accumulation area after the accumulation by said stop of a second group of articles equal in number to said first group.

12. Article handling apparatus comprising a conveyer having an article accumulation area upon the conveying surface thereof, means for accumulating a first group of articles upon a first portion of said accumulation area, means actuable upon the accumulation of a predetermined number of articles in said first group to transfer said first group of articles to a second portion of said accumulation area, means actuable upon the transfer of said first group of articles to said second portion to raise said first group of articles free of the conveying surface, and means for simultaneously releasing the accumulating means and lowering said first group of articles onto the conveying surface to permit movement of articles from said first and said second portions upon the accumulation by the accumulating means of a second group of articles, equal in number to said first group, upon said first portion.

13. Article handling apparatus comprising a conveyer having an article accumulation area upon the conveying surface thereon, means for guiding conveyed articles entering said accumulation area to a first portion thereof, means for accumulating articles upon said first portion of said accumulation area, means actuable upon the accumulation of a predetermined number of articles upon said first portion to transfer the accumulated articles as a first group to a second portion of said accumulation area immediately adjacent said first portion, means actuable upon the transfer of said first group to said second portion to raise said first group free of the conveying surface, and means for simultaneously releasing the accumulating means and lowering said first group of articles to the conveying surface to permit movement of articles from said first and second portion upon the accumulation by the accumulating means of a second group of articles, equal in number to said first group, upon said first portion.

14. Article handling apparatus as recited in claim 13 including means for retracting said means for guiding articles to a position adjacent one side of said conveyer and means actuated by said guide means when retracted to said position for permitting direct and uninterrupted flow of articles through said accumulation area.

15. Article handling apparatus comprising a conveyer having an article accumulation area upon the conveying surface thereof, means for guiding articles entering said accumulation area to a first portion thereof, means for accumulating a first group of articles upon said first portion, means actuable upon the accumulation of a predetermined number of articles in said first group to transfer said first group of articles to a second portion of said accumulation area shielded from articles entering said accumulation area by said guide means, means actuable upon the transfer of said first group to said second portion to raise said first group free of the conveying surface, and means for simultaneously releasing the accumulating means and lowering said first group of articles to the conveying surface to permit movement of articles from said first and second portions upon the accumulation by said accumulating means of a second group of articles, equal in number to said first group, upon said first portion.

16. Article handling apparatus as recited in claim 15 including means for retracting said means for guiding articles to a position adjacent one side of said conveyer and means actuated by said guide means when retracted to said position for permitting direct and uninterrupted flow of articles through said accumulation area.

17. Article handling apparatus comprising a conveyer having an article accumulation area upon the conveying surface thereof, a retractable stop operable to prevent or permit movement of articles from the discharge end of said accumulation area, means actuable upon the accumulation of a first group of articles by said stop to transfer the accumulated articles from that portion of the accumulation area upon which they have accumulated to an adjacent portion of said accumulation area, means actuable upon the transfer of articles to said adjacent portion to raise the transferred articles free of the conveying surface, and means for retracting said stop and lowering said first group of articles to permit movement of articles from said accumulation area upon the accumulation by said stop of a second group of articles equal in number to said first group.

18. Article handling apparatus comprising a conveyer, a retractable guide member movable to and from a guiding location above said conveyer to direct conveyed articles to a first portion of said conveyer extending along one side thereof, a pusher plate located along said one side of said conveyer, article controlled means operable when said guide member is in said guiding location to drive said pusher plate transversely of said conveyer to transfer selected groups of articles from said first portion of said conveyer to a second portion of said conveyer extending along the opposite side thereof downstream from said guide, and article controlled means for releasably retaining transferred articles at said second portion.

19. Article handling apparatus comprising a conveyer, a retractable guide member movable to and from a guiding location above said conveyer to direct conveyed articles to a first portion of said conveyer extending along one side thereof, a retractable stop located at the discharge end of said first portion operable in its non-retracted position to accumulate articles on said first portion, a pusher plate extending along said one side of said conveyer between said guide member and said stop, and article controlled means operable when said guide member is in said guiding location to drive said pusher plate transversely of said conveyer to transfer selected groups of articles accumulated by said stop from said first portion of said conveyer to a second portion of said conveyer extending along the opposite side thereof between said guide member and said stop.

20. Article handling apparatus comprising a conveyer, a retractable guide member movable to and from a guiding location above said conveyer to direct conveyed articles to a first portion of said conveyer extending along one side thereof, a retractable stop located at the discharge end of said first portion operable in its non-retracted position to accumulate articles on said first portion, a pusher plate extending along said one side of said conveyer between said guide member and said stop, article controlled means operable when said guide member is in said guiding location to drive said pusher plate transversely of said conveyer to transfer alternate groups of articles accumulated by said stop from said first portion of said conveyer to a second portion of said conveyer extending along the opposite side thereof between said guide member and said stop, and means for retracting said stop upon the accumulation of a group of articles on each of said first and said second portions to permit said articles to be discharged simultaneously from said portions in side by side relation.

21. Article handling apparatus comprising a conveyer having an article accumulation area thereon, means for feeding articles in single line on to a selected first portion of said accumulation area, means responsive to the presence of a group consisting of a selected number of articles on said first portion of said accumulation area for transferring articles from said first portion of said accumulation area to a second portion thereof, releasable means for retaining transferred articles at said last mentioned portion of said accumulation area, and means responsive to the accumulation of a subsequent group of articles upon said selected first portion for releasing said releasable means to permit transferred articles to move from said second portion of said accumulation area and to permit said subsequent group of articles to move from said accumulation area in side by side relationship with said transferred articles.

22. Article handling apparatus comprising a conveyer having an article accumulation area thereon, means for feeding successive groups of articles in single line at random onto a selected first portion of said accumulation area, means responsive to the presence of a group of articles on said first portion of said accumulation area for transferring the last mentioned group of articles transversely of said conveyer to a second portion of said accumulation area, releasable means operable by the transfer of a group of articles to said second portion for preventing movement of transferred articles from said second portion, and means responsive to the presence of a subsequent group of articles on said first portion of said accumulation area for rendering said releasable means ineffective to prevent movement of transferred articles from said second portion to permit transferred articles to be conveyed from said second portion in side by side relationship with said subsequent group of articles.

23. Article handling apparatus comprising a conveyer having an article accumulation area thereon, means for feeding successive groups of articles in single line onto a selected first portion of said accumulation area, transfer means responsive to the presence of a group of articles on said first portion of said accumulation area for transferring the last mentioned group of articles transversely of said conveyer to a second portion of said accumulation area, releasable means for preventing movement of transferred articles from said second portion, first means responsive to the presence of a subsequent group of articles on said first portion of said accumulation area for rendering said releasable means ineffective to prevent movement of transferred articles from said second portion, and second means responsive to the presence of a group of articles on both said first and said second portion for rendering the transfer means ineffective to act upon said subsequent group of articles to thereby permit said subsequent group of articles to be conveyed directly from said accumulation area in side by side relationship with transferred articles released from said second portion.

24. An article handling apparatus comprising a conveyor having means for continuously moving articles on the conveying surface thereof, a guide member disposed above said conveyor for directing conveyed articles to a first portion of said conveying surface extending along one side of said conveyor, a pusher plate located along said one side of said conveyor, and article controlled means for moving said pusher plate transversely on said conveyor to transfer alternate groups of articles from said first portion of said conveying surface to a second portion of said conveying surface extending along the opposite side of said conveyor downstream from said guide, and means for holding the group of articles transferred to the said opposite side of the conveying surface, while a group of articles on the first side of the conveying surface are moved into side-by-side relationship with the said group of articles held on the opposite side of the conveying surface.

References Cited in the file of this patent

UNITED STATES PATENTS

| | | |
|---|---|---|
| 2,649,231 | Ferguson | Aug. 18, 1953 |
| 2,703,182 | Broberg | Mar. 1, 1955 |
| 2,726,751 | Levitt | Dec. 13, 1955 |